Patented May 2, 1944

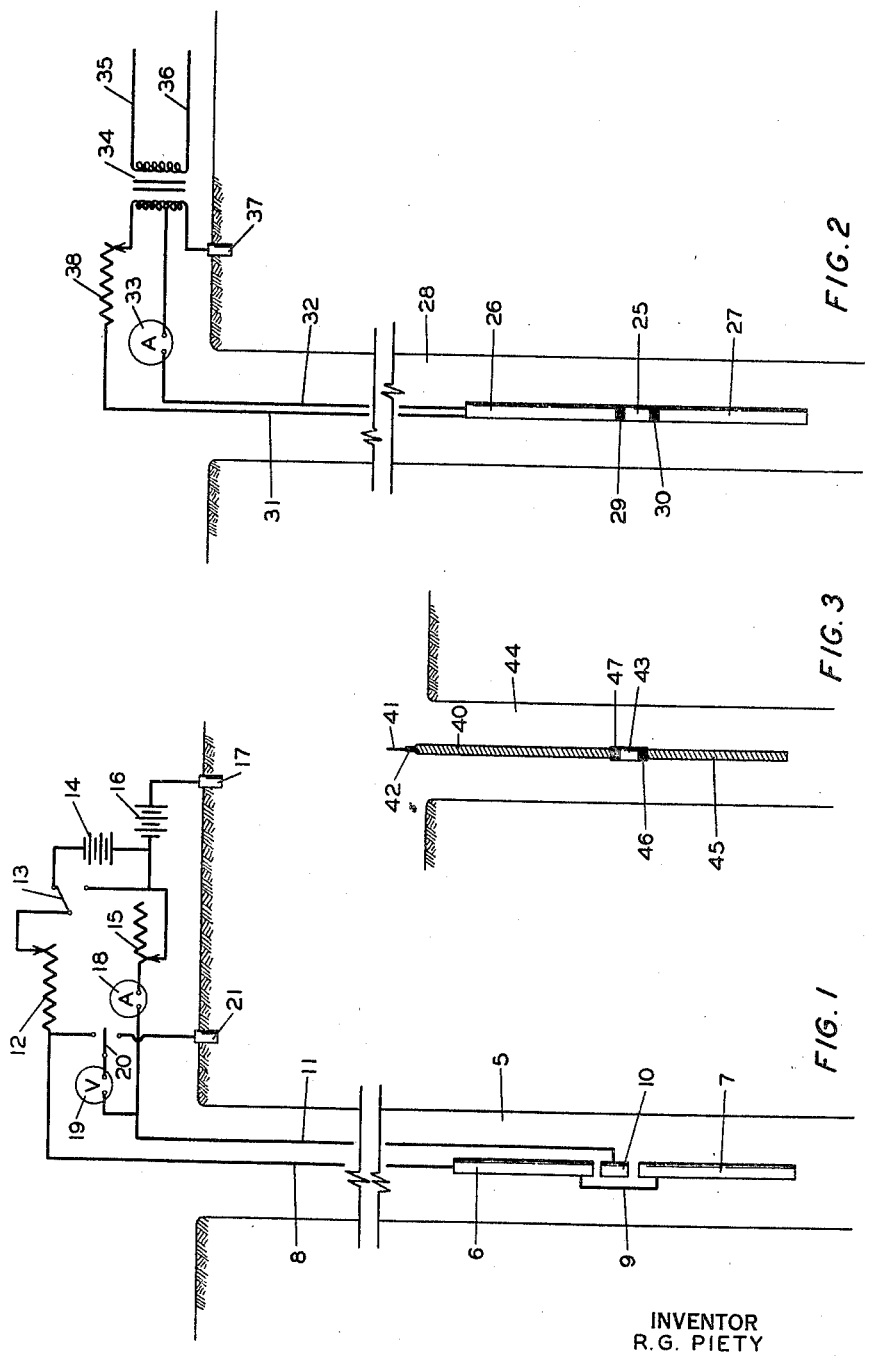

2,347,794

UNITED STATES PATENT OFFICE 2,347,794

WELL SURVEYING DEVICE

Raymond G. Piety, Bartlesville, Okla., assignor to Phillips Petroleum Company, a corporation of Delaware Application March 15, 1941, Serial No. 383,592

8 Claims. (Cl. 175—182)

This invention relates to improvements in the apparatus and method of determining the nature of geological structures by electrical means.

In drilling for oil it is desirable to obtain information which will identify the geological strata pierced by the drill hole. Among other methods developed to accomplish this purpose are methods of electrical well logging. Electrical well logging of bore holes is carried out by various types of devices in which two or more electrodes are lowered into the well bore for the purpose of determining certain physical properties associated with the different formations surrounding the well bore. The most important property, from the standpoint of electrical well logging, is the electrical resistivity which varies widely in different formations due to variations in the quantity and quality of fluid contained therein. Shales, generally, have a low resistance; sandstones, a higher resistance; coal, a still higher resistance. The electrical potential generated at the interface between the drill hole and porous formations which it penetrates, the so-called "self-potential," also furnishes useful information.

An object of this invention is to provide improvements in apparatus for electrical exploration of bore holes.

Another object of this invention is to provide improved methods of exploring bore holes electrically.

Still another object of this invention is to provide an improved electrode for use in logging bore holes.

Other objects and advantages will be apparent from the detailed description and from the accompanying drawing.

According to the present invention, which is an improvement on the invention disclosed in United States Patent No. 2,266,071, granted December 16, 1941, electric current is passed through the earth formations to an exploring electrode in a well bore. The exploring electrode is used in conjunction with an elongated electrode having substantially the same potential value. The elongated electrode comprises two vertically spaced sections, one above and one below the exploring electrode, which are electrically connected. The electrode assembly extends over several lithologic changes, receiving current through several earth strata. The two piece elongated electrode acts as an electrical guard ring for the exploring electrode and insures radial flow of current from the formations adjacent the exploring electrode to the exploring electrode.

Figure 1 is a diagrammatic view showing the present invention in operation in a well bore.

Figure 2 is a diagrammatic view of a modification of this invention.

Figure 3 is a diagrammatic view of a modification of the well logging electrode forming a part of this invention.

Referring to Figure 1, the numeral 5 designates a bore hole in which electrical measurements are to be made. An elongated electrode comprising two sections 6 and 7, is suspended in the bore hole and attached to the electrical conductor 8. The two sections of the elongated electrode are electrically connected by an insulated conductor 9. Interposed between the sections of the elongated electrode is a relativly short electrode 10 attached to an electrical conductor 11. The elongated electrode communicates through the conductor 8, variable resistance 12 and switch 13 with one terminal of a source of electrical potential 14. The electrode 10 communicates through the conductor 11 and resistance 15 with one terminal of another source of electrical potential 16. The sources of electrical potential 14 and 16 are arranged in series. The opposite terminal of the source of electrical potential 16 is connected to an electrode 17 which may be placed on the surface of the earth or in the bore hole. Preferably the electrode 17 is placed in the slush pit at the surface of the earth. An ammeter 18 is interposed between the source of potential 16 and the conductor 11 to measure the amount of current flowing at any given time through the conductor 11. A voltmeter 19 is connected to the conductor 11 and to the switch 20. By manipulation of the switch 20, the voltmeter can be used to measure the difference in potential between conductor 11 and conductor 8 or between the conductor 11 and the grounded electrode 21.

It will be understood that the electrodes in the well bore are immersed in drilling fluid or natural well fluids. There is resistance to the passage of electric current through the well fluid and some surface resistance between the electrode and the well fluid. It can be shown mathematically and experimentally that the size and shape of the electrodes has considerable bearing on the effect of these resistances in a well logging system. The spherical or point electrodes are much more affected by these resistances than are cylindrical electrodes used under the same conditions, and short isolated cylindrical electrodes are much more affected than are long cylindrical electrodes. The effect of the resistances nearest the electrode on the different types of electrodes will be evident from a consideration of the current density in the well fluid and earth formation surrounding the electrode when it is suspended in a well bore. The current density in the medium surrounding a point electrode varies inversely as the square of the distance from the point electrode, whereas the current density in the formation surrounding a long cylindrical electrode varies inversely as the distance from the electrode. In well logging the resistance of interest is that of the earth formation surrounding the well bore rather than that of the well fluids. Heretofore long cylindrical electrodes have not been used as the exploring electrode in well logging because the elongated electrode in itself does not give a sharp distinction between formations having different electrical properties. The present invention provides an electrode arrangement having the advantages of both types of electrodes. The relatively short electrode 10 acts as an isolated segment of a long cylindrical electrode. The advantages of the current distribution from a long cylindrical electrode are thus obtained in the electrode 10 without sacrificing the sharpness of distinction characterizing the point electrode.

In operation, potential is applied across the electrode assembly, comprising the elongated electrode and the interposed electrode 10, in the well bore and the grounded electrode 17 by means of the electrical potential sources 14 and 16. Since the potential sources are connected in series, the electrical sign of the elongated electrode and of the electrode 10 are the same. Electrical current flows from the grounded electrode 17 to the segments 6 and 7 of the elongated electrode and to the electrode 10 through the intervening earth strata. The elongated electrode extends over several lithologic changes. Electric current enters the electrode assembly along its entire length, more entering the sections immediately adjacent strata of low resistivity.

The resistance 15 is adjusted to a low value so that the changes in the quantity of current flowing between the electrode 10 and the electrode 17 are dependent largely upon the resistance of the formations immediately surrounding the electrode 10. The resistance 12 is adjusted to a high value such that the current flowing between the electrode 17 at the surface and the elongated electrode in the well bore is substantially constant. The source of electrical potential 14 is of such value that under average operating conditions in any given bore hole the magnitude of the potential of the elongated electrode is substantially the same as that of the shorter electrode 10. Since the potential and electrical sign of the elongated electrode and of the shorter electrode are substantially constant, the net effect with regard to the distribution of current in the formation is the same as though a single elongated electrode were in place in the well. This arrangement results in indications from the exploring electrode, which are more indicative of the nature of the formations surrounding the well bore than are those obtainable with conventional exploring electrodes.

The quantity of electric current from the surrounding formation entering electrode 10 varies with the conductivity of the surrounding formation. The electrode 10 is relatively short and serves as the exploring electrode. Current entering the electrode 10 is measured at the surface of the earth by the ammeter 18 which is preferably a recording ammeter of known type. The current flowing into electrode 10, inversely proportional to the resistivity of the formation surrounding the electrode, may conveniently be recorded against the depth of the electrode in the bore hole. The bore hole or any section of it is logged by moving the electrodes along the well bore and simultaneously recording the current flowing through the ammeter 18. The resistance 12 is adjusted to a high value such that the quantity of current entering the elongated electrode is substantially constant regardless of the resistivity of the formations adjacent the elongated electrode. The source of electrical potential 14 has a value equivalent to the potential drop across the resistance 12 and conductor 8, less the potential drop across conductor 11 and resistance 15 under average operating conditions in the bore hole. While the characteristics of the circuit elements may vary widely, depending upon conditions at the test well, a typical approximate set of valves might include the following: source of electrical potential 16, 4 volts; source of electrical potential 14, 16 volts; conductor 8 plus resistance 12, 10 ohms; conductor 11 plus resistance 15, 10 ohms; resistance from elongated electrode comprising sections 6 and 7 to ground by way of electrode 17 at a given point, 2 ohms; resistance from electrode 10 to ground by way of electrode 17, 10 ohms. The value of the current flowing through the elongated electrode would then approximate one ampere, while meter 18 would show about ⅕ of an ampere passing through electrode 10. The meter 18 may show variations of ¹⁄₅₀ of an ampere or less. The potential of the elongated electrode is thereby maintained at a value substantially equivalent to the potential of the exploring electrode.

Current enters the electrodes parallel to the bedding plane or substantially horizontally. The net effect of using these electrodes in the circuit disclosed herein is to cause the current path to penetrate deep into the formation thereby making the measurements indicative of the nature of the formation to a greater degree than former methods. The elongated electrode serves also as a guard ring for the electrode 10 which contributes to the sharpness of definition obtainable with this apparatus.

An alternative method of operating the system of Figure 1 is as follows. The source of potential 14 is cut out of the circuit and potential from source 16 applied to the elongated electrode by operation of the switch 13. The variable resistance 15 is then increased to a high value such that the current entering the electrode 10 is substantially constant. Variations in the resistivity of the formations opposite the exploring electrode 10 are indicated by variations in the potential of the exploring electrode. The variations in potential of the exploring electrode 10 are measured by the voltmeter 19 which is conveniently of the recording type. These variations may be measured either between the electrodes in the well bore, i. e., between the conductors 8 and 11, or between the exploring electrode 10 and the grounded electrode 21 by operation of the switch 20. The ammeter 18 may be used at the same time to measure the quantity of current entering the electrode 10.

An optional system employing the same principles is shown diagrammatically in Figure 2. The exploring electrode 25 and the elongated electrode, comprising the exposed metallic sections 26 and 27, are suspended in the bore hole 28. The sections 26 and 27 are in electrical communication with one another and are electrically insulated from the exploring electrode 25 by intervening sections of suitable insulating material 29 and 30. The sections of the elongated electrode, the exploring electrode, and the insulating material are joined to form a unit which is convenient for use in the bore hole exploration. Conductor 31 provides communication between the elongated electrode, i. e., sections 26 and 27, and the surface of the earth. The conductor 32 communicates with the exploring electrode 25 and the recording ammeter 33 at the surface of the earth. A source of alternating current, suitably a transformer 34, provides the source of electrical potential. Alternating current from an outside source is fed to the primary winding of the transformer through the conductors 35 and 36. One side of the secondary winding of the transformer is attached to a grounded electrode 37. The other side of the secondary winding is attached through the variable resistance 38 to the conductor 31. At an intermediate point, the secondary winding is tapped off and connected to the ammeter 33 through which current may flow to or from the exploring electrode.

It will be apparent to those skilled in the art that the transformer 34 serves as a source of alternating current for the well logging. The potential between the ammeter 33 and the grounded electrode 37 is less than the potential between the electrode 37 and the side of the transformer connected to resistance 38. As described in connection with Figure 1, the resistance 38 is set at a high value relative to the resistance of the formation, whereby the resistance 38 controls the current flow between the elongated electrode and the grounded electrode 37 maintaining the current at a substantially constant value. The potential drop across the resistance 38 under average operating conditions in the well bore is such that the potential of the sections 26 and 27 of the elongated electrode is substantially equal to the potential of the exploring electrode 25. The operation of this modification is the same as that of the apparatus of Figure 1. Variations in the resistivity of the formations encountered by the exploring electrode are recorded by means of the recording ammeter 33.

In Figure 3 is illustrated a modification of the elongated and exploring electrodes. In this instance an armored cable having a metallic sheath 40 and a conductor 41 insulated therefrom by suitable electrical insulation 42 serves to position the exploring electrode 43 in the well bore 44. A section 45 of the cable extends below the exploring electrode and is insulated therefrom by a section of electrical insulation 46. The exploring electrode 43 is insulated from the sheath 40 of the cable by the section of electrical insulation 47. The electrical conductor 41 is in electrical communication with the exploring electrode 43 and serves to carry current from the exploring electrode to recording instruments, hereinbefore described, at the surface of the earth. The metallic sheath of the section of cable 45 is electrically connected to the sheath 40 of the armored cable. This sheath or armor serves to form the two sections of the elongated electrode and also serves as an electrical conductor which may extend to the surface of the earth.

I claim:

1. A method of electrically logging a bore hole comprising suspending an elongated electrode in the bore hole to be logged, grounding a second electrode, setting up an electrical potential between the two electrodes whereby electric current flows between the two electrodes, suspending an exploring electrode in the well bore intermediate the ends of the elongated electrode end electrically insulated therefrom, simultaneously setting up an electrical potential between the exploring electrode and the second electrode, simultaneously moving the elongated electrode and the exploring electrode in fixed relation thereto along the bore hole, and simultaneously measuring the current flowing between the exploring electrode and the second electrode as the exploring electrode moves along the bore hole.

2. A method of electrically logging a bore hole comprising suspending an elongated electrode in the bore hole to be logged, grounding a second electrode, setting up an electrical potential between the two electrodes whereby electric current flows between the two electrodes, maintaining the said current flow at a substantially constant value, suspending an exploring electrode in the well bore intermediate the ends of the elongated electrode and electrically insulated therefrom, simultaneously setting up an electrical potential between the exploring electrode and the second electrode, simultaneously moving the elongated electrode and the exploring electrode in fixed relation thereto along the bore hole, and simultaneously measuring the current flowing between the exploring electrode and the second electrode as the exploring electrode moves along the bore hole.

3. A method of electrically logging a bore hole comprising suspending an elongated electrode in the bore hole to be logged, grounding a second electrode, setting up a substantially constant flow of electric current between the two electrodes, suspending an exploring electrode in the well bore intermediate the ends of the elongated electrode and electrically insulated therefrom, simultaneously setting up a substantially constant flow of electric current between the exploring electrode and the second electrode, simultaneously moving the elongated electrode and the exploring electrode in fixed relation thereto along the bore hole, and simultaneously measuring the difference in potential between the elongated electrode and the exploring electrode as they move along the bore hole.

4. A method of electrically logging a bore hole comprising suspending an elongated electrode in the bore hole to be logged, grounding a second electrode, setting up an electrical potential between the two electrodes whereby electric current flows between the two electrodes, maintaining the said current flow at a substantially constant value, suspending an exploring electrode in the well bore intermediate the ends of the elongated electrode and electrically insulated therefrom, simultaneously setting up an electrical potential between the exploring electrode and the second electrode substantially equal to the potential between the elongated electrode and the second electrode, simultaneously moving the elongated electrode and the exploring electrode in fixed relation thereto along the bore hole, and simultaneously measuring the current flowing between the exploring electrode and the second electrode as the exploring electrode moves along the bore hole.

5. A method of electrically logging a bore hole comprising suspending an elongated electrode in the bore hole to be logged, grounding a second electrode, setting up a substantially constant flow of electric current between the two electrodes, suspending an exploring electrode in the well bore intermediate the ends of the elongated electrode and electrically insulated therefrom, simultaneously setting up a substantially constant flow of electric current between the exploring electrode and the second electrode, simultaneously moving the elongated electrode and the exploring electrode in fixed relation thereto along the bore hole, and simultaneously measuring the difference in potential between surface of the earth and the exploring electrode as the exploring electrode is moved along the bore hole.

6. Apparatus for electrically logging a bore hole comprising an elongated electrode having two vertically spaced sections, an exploring electrode intermediate the sections of the elongated electrode and electrically insulated therefrom, means for simultaneously moving the elongated electrode and exploring electrode along the bore hole, a grounded electrode, means for independently and simultaneously setting up approximately equal potential drops between the first two electrodes and the grounded electrode, and means for simultaneously measuring the electric current flowing between the exploring electrode and the grounded electrode.

7. Apparatus for electrically logging a bore hole comprising an elongated electrode having two vertically spaced sections, an exploring electrode intermediate the sections of the elongated electrode and electrically insulated therefrom, means for simultaneously moving the elongated electrode and the exploring electrode in fixed relation thereto along the well bore, a grounded electrode, means for setting up a substantially constant electric current between the elongated electrode and the grounded electrode, means for simultaneously setting up a substantially constant electric current between the exploring electrode and the grounded electrode, and means for simultaneously indicating the difference in potential between the elongated electrode and the exploring electrode.

8. Apparatus for electrically logging a bore hole comprising an elongated electrode having two vertically spaced sections, an exploring electrode intermediate the sections of the elongated electrode and electrically insulated therefrom, means for simultaneously moving the elongated electrode and the exploring electrode in fixed relation thereto along the well bore, a grounded electrode, means for setting up a substantially constant electric current between the elongated electric and the grounded electrode, means for simultaneously setting up a substantially constant electric current between the exploring electrode and the grounded electrode, and means for simultaneously indicating the difference in potential between the exploring electrode and the ground.

RAYMOND G. PIETY.